(12) United States Patent
Wack et al.

(10) Patent No.: US 12,335,241 B2
(45) Date of Patent: Jun. 17, 2025

(54) CRYPTOGRAPHIC COMMUNICATION BINDING SYSTEM AND METHOD

(71) Applicant: TecSec, Inc., McLean, VA (US)

(72) Inventors: C. Jay Wack, Clarksville, MD (US); Roger Butler, Centreville, VA (US)

(73) Assignee: Safe Harbor Digital Asset Security LLC, Grasonville, MD (US)

( * ) Notice: Subject to any disclaimer, the term of this patent is extended or adjusted under 35 U.S.C. 154(b) by 0 days.

(21) Appl. No.: 17/990,544

(22) Filed: Nov. 18, 2022

(65) Prior Publication Data

US 2025/0047648 A1   Feb. 6, 2025

Related U.S. Application Data

(60) Provisional application No. 63/281,169, filed on Nov. 19, 2021.

(51) Int. Cl.
*H04L 9/40* (2022.01)
*H04L 9/08* (2006.01)

(52) U.S. Cl.
CPC ........ *H04L 63/0428* (2013.01); *H04L 9/0861* (2013.01)

(58) Field of Classification Search
CPC .......................... H04L 63/0428; H04L 9/0861
USPC ........................................................ 713/160
See application file for complete search history.

(56) References Cited

U.S. PATENT DOCUMENTS

| | | | | |
|---|---|---|---|---|
| 5,812,671 A * | 9/1998 | Ross, Jr. | ................... | H04L 9/40 713/153 |
| 7,590,238 B2 * | 9/2009 | Kamijoh | ............... | H04L 9/0836 380/278 |
| 8,555,361 B2 * | 10/2013 | Nakhjiri | ................ | H04L 63/061 380/247 |
| 8,667,265 B1 * | 3/2014 | Hamlet | ................ | H04L 9/3278 713/185 |
| 8,751,796 B2 * | 6/2014 | Vogt | .................... | H04L 61/5084 713/162 |
| 8,990,569 B2 * | 3/2015 | Haynes | ................. | H04L 9/3263 713/169 |
| 11,880,832 B2 * | 1/2024 | Viola | .................... | H04W 12/48 |
| 2001/0010724 A1 * | 8/2001 | Murakami | ............ | H04L 9/0866 713/180 |

(Continued)

*Primary Examiner* — Amare F Tabor
(74) *Attorney, Agent, or Firm* — IP Strategies

(57) ABSTRACT

A method of cryptographically binding communication parties includes assigning attributes to parties, and performing a combine operation including creating communication keys. Data is encrypted using a session key. A recombine operation includes receiving output parameters, along with the session key if the parameters are validated. A cryptographic communication binder includes an attribute mixer configured to assign attributes to the parties, and a combiner configured to create communication keys. A communication key generator is configured to combine attributes to create the session key. A first cryptographic engine is configured to encrypt data using the session key and create output parameters. A recombiner is configured to receive the output parameters and identity attribute, validate the parameters, and identify and validate the originator. A second cryptographic engine is configured to receive the encrypted data and session key, if validating and identifying were successful, and to decrypt the encrypted data using the session key.

16 Claims, 9 Drawing Sheets

(56) References Cited

U.S. PATENT DOCUMENTS

| | | | |
|---|---|---|---|
| 2007/0183600 A1* | 8/2007 | Smart | H04L 9/3073 |
| | | | 380/286 |
| 2008/0301445 A1* | 12/2008 | Vasic | G06F 16/10 |
| | | | 713/171 |
| 2009/0028342 A1* | 1/2009 | Cerruti | H04L 9/0891 |
| | | | 380/279 |
| 2018/0026950 A1* | 1/2018 | Wasiq | H04L 9/0841 |
| | | | 713/152 |
| 2023/0155825 A1* | 5/2023 | Wu | H04L 9/3231 |
| | | | 380/44 |

* cited by examiner

CRYPTOGRAPHIC COMMUNICATION BINDING SYSTEM AND METHOD

CROSS-REFERENCE TO RELATED APPLICATIONS AND PATENTS

This is related to, and claims priority from, U.S. Provisional Application for Patent No. 63281169, which was filed on Nov. 19, 2022, the disclosure of which is incorporated herein in its entirety. This is also related to the subject matter of U.S. Pat. Nos. 6,490,680; 6,542,608; 6,549,623; 6,606,386; 6,608,901; 6,684,330; 6,694,433; 6,754,820; 6,694,433; 6,754,820; 6,845,453; 7,016,495; 7,079,653; 7,089,417; 7,095,851; 7,095,852; 7,111,173; 7,131,009; 7,490,240; 7,539,855; 7,738,660; 7,817,800; 7,974,410; 8,077,870; 8,285,991; and 8,712,046, the disclosures of all of which are incorporated herein in their entireties.

FIELD OF THE INVENTION

The invention relates to secure communication systems.

BACKGROUND OF THE INVENTION

Communications are passed between parties in a variety of different ways utilizing many different communications media. Electronic communication is an efficient manner of transferring information. Unfortunately, drawbacks accompany the benefits provided by electronic communication, particularly in the area of security. Electronic communications can be intercepted by unintended recipients, and can be sent by entities who aren't who they claim to be. Wireless transmissions are especially susceptible to such interception.

These issues have been addressed in various ways. One form of solution uses cryptography to provide privacy for electronic communication. Cryptography involves the encrypting or encoding of a transmitted or stored message, followed by the decryption or decoding of a received or retrieved message. The message usually takes the form of a digital signal, or a digitized analog signal. If the communication is intercepted during transmission or is extracted from storage by an unauthorized entity, the message is worthless to the interloper, who does not possess the means to decrypt the encrypted message.

In a system utilizing cryptography, the encrypting side of the communication incorporates an encoding device or encrypting engine. The encoding device accepts the plaintext (unencrypted) message and a cryptographic key, and encrypts the plaintext message with the key according to an encrypt relation that is predetermined for the plaintext communication and the key. That is, the message is manipulated with the key in a predetermined manner set forth by the text/key relation to produce a ciphertext (encrypted) message.

Likewise, the decrypting side of the communication incorporates a decoding device or decrypting engine. The decoding device accepts the ciphertext message and a cryptographic key, and decrypts the ciphertext message with the key according to a decrypt relation that is predetermined for the ciphertext message and the key. That is, the message is manipulated with the key in a predetermined manner set forth by the text/key relation to produce a new plaintext message that corresponds with the original plaintext message.

The manner in which the key and the relation are applied in the communication process, and the manner in which keys are managed, define a cryptographic scheme. There are many conventional cryptographic schemes in use today. For example, probably the most popular of these is a public-key cryptographic scheme. According to a scheme of this type, the keys used are actually combinations of a public key component that is available to anyone or to a large group of entities, and a private key component that is specific to the particular communication.

An important consideration in determining whether a particular cryptographic scheme is adequate for the application is the degree of difficulty necessary to defeat the cryptography, that is, the amount of effort required for an unauthorized person to decrypt the encrypted message. One way to improve the security of the cryptographic scheme is to minimize the likelihood that a valid key can be stolen, calculated, or discovered. The more difficult it is for an unauthorized person to obtain a valid key, the more secure communications will be under a particular scheme.

Thus, cryptographic keys are an essential part of the information encryption process. The key typically is a sequence of characters that is manipulated by a cryptographic algorithm to transform data from plain (readable) text to a series of unintelligible text or signals known as encrypted or cipher text. The key is then used by the receiver of the cipher text to decrypt the message back to plain text. However, for two entities to communicate successfully using keys, each must use the same key or inverse keys to encrypt the message being sent and to decrypt that message when received, assuming that the same encryption/decryption algorithm is used on both ends of the communication.

Various key management methods have evolved to manage the distribution of keys. For two people to communicate securely using conventional cryptography, those two persons must not only possess compatible cryptographic equipment, they must also have identical or corresponding keys. Further, those keys must be kept secret from anyone not in a position of confidence with the two communicators and must be changed periodically to guard against compromise. In addition to the protection of the keys themselves, selecting the proper key sequence and increasing the frequency with which the key sequence is changed can enhance the security of this type of protection. The function of key management is the process of generating, distributing, changing, replacing, storing, checking on, and destroying cryptographic keys. This is a critically important function.

Two major key management schemes have been developed over the years and are in use at the present time: classic pair-wise distribution and public key distribution. Both of these forms of key management have drawbacks. Distributing classic pair-wise key information is typically accomplished through the use of a courier service. The keys for a particular key time period, such as a day, an entire series of days, or any time period during which a particular key is valid, are delivered in printed, punch tape, electronic, or other form to a number of locations. Either a courier travels to all locations from a central key distribution site or couriers from the individual sites travel to a central location to pick up the keys. During any particular key time period, the same key is used by all cleared parties within the communications network, allowing messages to be encrypted and decrypted using that particular key. One drawback to the security of this type of distribution scheme is that it is based on trust. Any couriers used must be trusted, as they play an integral part of the authentication process. Also, to distribute keys effectively in a network requires that a matrix architecture be implemented to track user connectivity. The more subscribers to the network there are, the more complex the key matrix will be and the more difficult it is to maintain key management among changing users, since it is frequently the case that not everyone in a network will be using the same keys.

Sometimes more than one key is necessary in a classic key distribution scheme. In a single key system, anyone within a network who has the key is privy to any communication within the network. If one member of the network wants to transmit a communication to only one other particular member, the single key will afford him no protection from others in the network because everyone within the network shares the same key and can decrypt the message. Likewise, if someone wants to communicate a message to a subset of the network, that is, to a particular group within the network, the single key would provide her with no extra security. In these and other cases, multilevel key access, or multiple keys, would provide a solution, albeit one that is quite unwieldy, inflexible, and difficult to manage by a key administrator. The cost of maintaining this matrix of keys, using the courier service, and risking the possibility that the courier system may be compromised are major drawbacks that have led to the creation of a modified classic distribution scheme.

The modified classic distribution scheme also uses a courier for key distribution. However, the courier does not deliver the keys that are used to encrypt the files. Instead, the courier delivers a distribution key which is used to encrypt other keys that are in turn used to encrypt the files. In this way, the courier alone cannot compromise the network. This scheme offers the advantage of allowing the changing of the file key more frequently than in the classic scheme previously described. The disadvantage of the modified classic distribution scheme is that a compromise of the distribution key is far more serious than in the ordinary classic scheme since a compromise affects a collection of file keys and therefore a larger base of protected files.

With respect to generating keys, a cryptographic key split combiner has been utilized, which includes a number of key split generators for generating cryptographic key splits and a key split randomizer for randomizing the cryptographic key splits to produce a cryptographic key. Each of the key split generators generates key splits from seed data. The process for forming cryptographic keys under this scheme can include generating a number of cryptographic key splits from seed data and randomizing the cryptographic key splits to produce a cryptographic key.

For example, the key split generators can include a random split generator for generating a random key split based on reference data. Other key split generators can include, for example, a token split generator for generating a token key split based on label data and/or organization data and/or static data; a console split generator for generating a console key split based on maintenance data, whether previous or current, and/or on static data; and a biometric split generator for generating a biometric key split based on biometric data, which can include biometric data vectors and on biometric combiner data, and/or static data. The label data can be read from a storage medium, and can include user authorization data. The resulting cryptographic key can be, for example, a stream of symbols, at least one symbol block, or a key matrix.

Typically, a system for the secure communication of a message from a transmitting user to a receiving user using a split key scheme requires that each user generates a key component using a cryptographic engine. The key component is a pseudorandom sequence of bits with an appended error detection field which is mathematically calculated based on the pseudorandom sequence. This key component is then sent out on a communications channel from the transmitting user to the receiving user. The receiving user also sends its key component to the transmitting user. Each location performs a mathematical check on the key component received from the other location. If the key component checks pass at both locations, the transmit key component and the receive key component, including the error detection fields, are combined at both locations, forming identical complete keys at both locations. The identical complete keys are then used to initiate the cryptographic engines at both locations for subsequent encryption and decryption of messages between the two locations.

While these and similar systems have provided adequate data security, improvements in secure, authenticated person-to-person session-based communications is needed.

BRIEF SUMMARY OF THE INVENTION

The Constructive Key Management (CKM) Identity System (CKM IDS) is used to create cryptographic bindings between two or more parties at a point in time, in order to facilitate the secured communication of information from point-to-point, from person-to-person, or to a select group. This process assures that the communication session was originated by the person who claims to have initiated it, and assures that only specified recipients are able to read the data. In addition, each communication session is uniquely keyed.

The Constructive Key Management (CKM) Data Protection System (CKM DPS) has some of the same features but is designed for long-term data protection. CKM DPS is used to descriptively tag the data; those tags are then used to create the appropriate encryption key for that data. Although the CKM DPS process works very well with long-term data storage, the CKM Identity System is an improvement with respect to person-to-person session-based systems.

Both CKM DPS and CKM IDS assign cryptographic attributes to each entity. These attributes combine elements including a user-visible name, an internal ID, and a set of cryptographic keying material, which are combined in different ways to create data or communication session protection. A combiner and a recombiner are provided to combine attributes to create and recreate the data protection keys.

Each entity within the system has the following:
An Identity attribute that is used to identify this entity. This attribute includes all of the internal values for the attribute.
A list of "contacts". Each contact is a copy of the "write" portion of the identity attribute for that entity.
A user is any entity (service, server, computer, person, . . . ) identified in the overall system that has an Identity Attribute. These attributes (both the main identity attribute and the contacts) are used together in the key construction process to create the session keys to secure the communication data.

According to an aspect of the invention, a method of cryptographically binding communication parties includes assigning respective attributes to a sending party and to a receiving party, and performing a combine operation. The combine operation includes creating, by the sending party, communication keys.

The attributes can include an identity attribute, and input parameters. The input parameters include an originator attribute and a list of contacts. The identity attribute can include an origination encryption key pair, a pairing key pair, an origination signing key pair, an attribute symmetric key, a static key generating key, an identity ID, and/or an identity name.

Creating the communication keys can include combining values from the attributes to create an ephemeral key wrapping key, using the ephemeral key wrapping key to protect an ephemeral key generating key, and mixing at least the ephemeral key generating key and a static key generating key to create the session key.

The method can also include performing a key-rolling operation, which includes utilizing rolling key values to re-key at least one of the attributes.

The method can also include encrypting communication data using the session key, and sending the encrypted communication data to the receiving party. The method can also include creating output parameters, which can include at least some of the input parameters, and ephemeral data.

The method can also include performing a recombine operation, which can includes receiving, by the receiving party, the output parameters and the sending party identity attribute. The output parameters are validated, and the originator is identified and validated. The method also includes receiving, by the receiving party, the encrypted communication data. The receiving party also receives the session key if validating the output parameters and identifying and validating the originator were successful. The encrypted communication data are then decrypted by the receiving party, using the session key. The method also includes zeroing at least some of the output parameters if validating the output parameters and/or identifying and validating the originator was unsuccessful.

According to another aspect of the invention, a cryptographic communication binder includes an attribute mixer configured to assign respective attributes to a sending party and to a receiving party, and a combiner configured to create, by the sending party, communication keys.

The attributes can include an identity attribute, and input parameters. The input parameters include an originator attribute and a list of contacts. The identity attribute can include an origination encryption key pair, a pairing key pair, an origination signing key pair, an attribute symmetric key, a static key generating key, an identity ID, and/or an identity name.

The combiner can also include a communication key generator configured to combine values from the attributes to create an ephemeral key wrapping key, use the ephemeral key wrapping key to protect an ephemeral key generating key, and mix at least the ephemeral key generating key and a static key generating key to create the session key.

The cryptographic communication binder can also include a key roller configured to utilize rolling key values to re-key at least one of the attributes.

The cryptographic communication binder can also include a first cryptographic engine configured to encrypt communication data using the session key and send the encrypted communication data to the receiving party. The first cryptographic engine can also be configured to create output parameters, wherein the output parameters include at least some of the input parameters and ephemeral data.

The cryptographic communication binder can also include a recombiner configured to receive, by the receiving party, the output parameters and the sending party identity attribute, validate the output parameters, and identify and validate the originator.

The cryptographic communication binder can also include a second cryptographic engine configured to receive, by the receiving party, the encrypted communication data.

The second cryptographic engine is configured to receive, by the receiving party, the session key, if validating the output parameters and identifying and validating the originator were successful, and to decrypt the encrypted communication data by the receiving party, using the session key. The recombiner is also configured to zero at least some of the output parameters if validating the output parameters, and/or identifying and validating the originator, was unsuccessful.

DETAILED DESCRIPTION OF THE INVENTION

CKM IDS Combiner System

Figure 1:
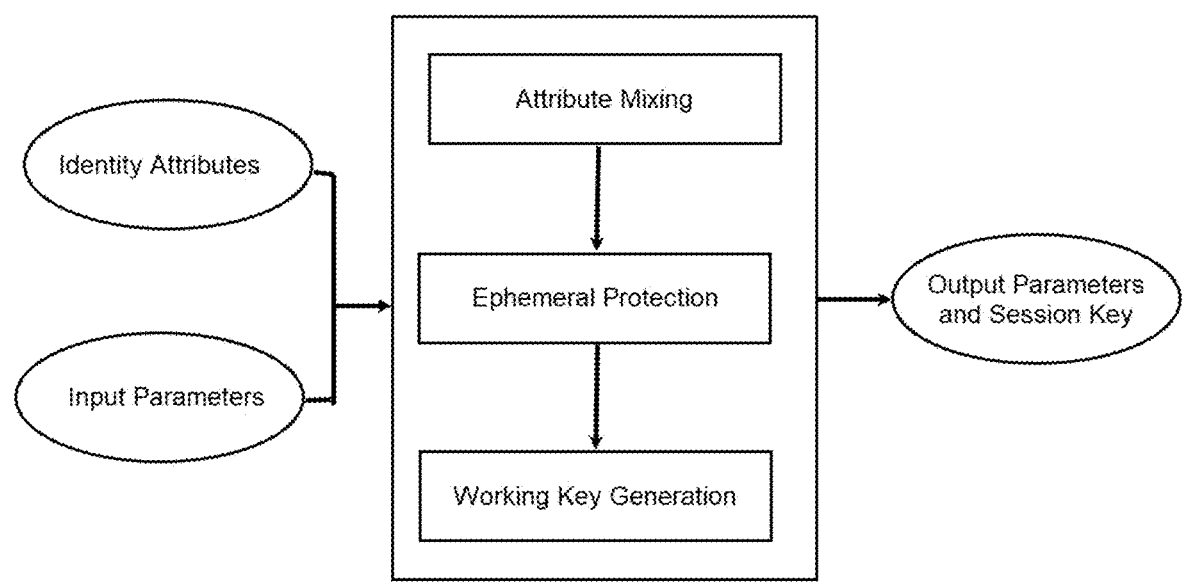
FIG. 1 is a block diagram of an exemplary combiner/recombiner according to the invention.

Referring to FIG. 1, the basic construct of the system of the invention is identified. The CKM IDS Combiner System includes a CKM IDS Combiner and a CKM IDS Recombiner. The high-level block diagram of FIG. 1 can apply to both the combiner and recombiner.

The CKM IDS Combiner (to be known in the rest of the document as the combiner) is used by the originator to create the communication keys and to establish the assurances that the session was created by the originator.

The CKM IDS Recombiner (to be known in the rest of the document as the recombiner) is used by a contact (recipient of the communications) to recreate the session key for this communication and thereby access the contained information. The recombiner also validates the assurance that the originator created the communication session.

The CKM IDS Combiner System is structured like the CKM DPS combiner system in that there are 3 stages. The first stage combines values from the attributes in a very specific manner and creates an ephemeral key wrapping key. This key wrapping key is used in the second stage to protect an ephemeral key generating key. The third stage mixes the ephemeral key generating key and static key generating key and other information to create the session key.

For the combine operation the input parameters include the list of contacts and the originator attribute. This information is used to create and protect ephemeral data and to create the session key. The output parameters include some of the input parameters and any ephemeral data that is needed for the recombine operation. These output parameters are sent to the recipients so that they can recreate the session key and access the information.

The recombine operation takes the output parameters from the combine operation as its input parameters. The recombine operation also takes the identity attribute for this user.

During the recombine operation, the input parameters are validated and the originator is identified and validated. Any error in the recombine validates and/or processing will yield in an error being returned and all sensitive and/or partial critical security parameters being zeroized. No leakage of partial information is allowed.

Identity Attribute Definition for CKM IDS

While the CKM DPS can have symmetric and asymmetric attributes, the CKM IDS only supports asymmetric attributes. The CKM DPS asymmetric attributes have two key pairs that provide data read/write or create/use functionality. The CKM IDS uses three key pairs and several symmetric values and some identification information, including:

Origination encryption key pair
Pairing key pair
Origination signing key pair
Attribute symmetric key (Ask)
Static Key Generating Key (sKGK)
Identity ID
Identity Name This keying material along with other ephemeral data is used to create a unique session key for a given session. Each value has a distinct and unique purpose.

1. Origination Encryption Key Pair

The origination encryption key pair is mixed with an ephemeral key to provide ephemeral data to the first stage of the combiner in a controlled manner. This key pair is distributed to all of the people with whom the originator will communicate (contacts). The contacts receive the private key of the key pair, which is combined with an ephemeral key pair to provide entropy to the key-wrapping key. Only contacts of the originator can recreate this value from the distributed ephemeral public key.

All entities will have the full key pair for the origination encryption key pair.

2. Pairing Key Pair

Each party in a conversation has its own unique pairing key pair. They distribute the public portion of the key pair to their contacts and keep the private key. The originator mixes its Pairing key to each of the contacts separately for this communication. This process creates a cryptographic binding for this communication between the originator and each contact. This process prevents any other person from the combined contact lists from recreating this value as all contacts have only the public keys.

Contact entities will have the public key and the owner will have both the public and private key for the pairing key pair.

3. Origination Signing Key Pair

The origination signing key pair is not an encryption or key agreement key pair. Instead, it is a signing key pair. Its purpose is to show proof that the originator and only the originator created this communication. If you only have the origination and pairing key pairs you would only have proof that one of the two parties created the communication. You could not block the ability of the contact to spoof (fake) a message and make it look like it came from the originator.

The signing key pair remedies this situation. Only the originator has the private signing key. The originator distributes the public key to its contacts. This allows the contacts to validate the signature but not to create one.

Contact entities will have the public key and the owner will have both the public and private keys for the origination signing key pair.

4. Attribute Symmetric Key

The attribute symmetric key is a symmetric value that has properties that allow it to be re-keyed. This value is adjusted to the appropriate keying level for the communication and is then mixed into the first stage of the combiner. This allows for the protection of future communications in the case of a breach, such as a leak or a bad contact. The CKM IDS system, like the CKM DPS system, supports the adjustment of this value through forward and backward levels. This value must be twice the length of the attribute rolling hash function, as described below. The number of forward/backward levels available in this attribute must be determined at the time of creation for the attribute.

All entities will have the full key value for the attribute symmetric key.

5. Static Key Generating Key

The static key generating key, like the attribute symmetric key, is a symmetric value. This value however is used to protect the third stage of the combiner. It also supports re-keying through the same forward and backward level system. This must be twice the length of the maintenance level rolling hash function as described later. The number of forward/backward levels available in this maintenance value must be determined at the time of creation for the attribute.

All entities will have the full key value for the static key generating key.

6. Identity ID

The Identity ID attribute is part of the data passed from the combiner to the recombiner. This is the public identification of the identity and is required to find the Identity Attributes when using the recombiner. This ID can be associated to a hardware device or to an entity.

All entities have the Identity ID field.

7. Identity Name

The Identity name is a private label used by the entity to know to whom the Identity Attribute belongs. This can be likened to a name in a contact list. This name does not pass between the combiner and recombiner. This name is treated as sensitive and PII information.

All entities receive the Identity name value but it can be changed in the contact list.

Key Rolling

The CKM IDS system utilizes a pair of rolling key values that allow for the re-keying of an attribute without having to totally replace the attribute. This system greatly reduces the number of static keys and the complexity of key management over time.

The process described herein applies to both the Attribute symmetric key (Ask) and the Static Key Generating Key (sKGK). In fact, within the CKM IDS system (unlike the CKM DPS system) the respective number of levels and the current level are the same between these two key values.

A sKGK is initially generated by the computation of two equal-sized blocks of random data. The length of each block is dictated by the output block size of the key rolling hash algorithm. This random value is stored in the originating system that generates the Identity attribute. Examples of Identity Attributes generators include Quantum Cloak Devices and the VEIL Enterprise Builder system. The two components are the Forward data and the Backward data. These values are generated and then manipulated through a Key Roller process to create a new sKGK (or Ask) that is assigned to an entity through the an Identity Attribute. This rolling process uses the versions to control how far the value is rolled. The Forward data is rolled to provide Forward Data secrecy. The Backward data is rolled to provide Backward secrecy.

Figure 2:
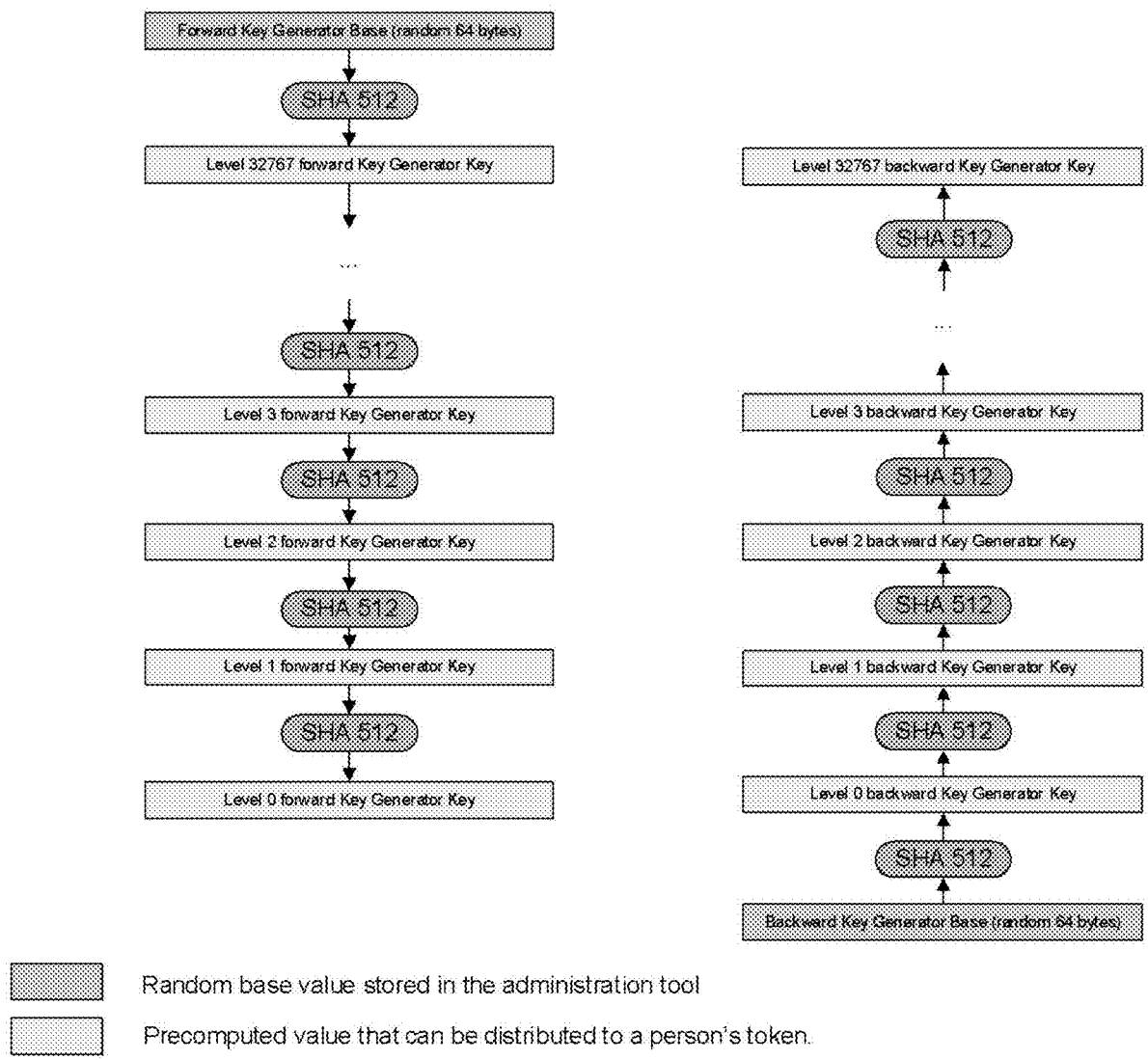
FIG. 2 is a diagram of an exemplary rolling process according to the invention.

FIG. 2 shows the exemplary use of SHA-512 as the rolling function. The SHA-512 process would then dictate that the sKGK and Ask values are 128 bytes in length. If SHA-256 is used instead, then the sKGK and Ask would be 64 bytes in length. Any one-way function can be used when the attribute is created, but that algorithm must be used consistently during any session. The system allows for flexibility in this respect but an implementation of the CKM IDS might dictate the algorithm or limit the algorithms available for this function. Also, this example shows the use of a maximum of 32,767 levels. This also may be set at the time of creation but may not be changed later. Again, the particular implementation may set a limit or use the flexible system described here.

The key roller process uses one-way functions to control key lifetime access within the CKM IDS process through the forward and backward secrecy process. In order to recreate a given session key, the recombiner must be able to adjust the sKGK and Ask so that it matches the values used in the combine operation, including both the forward and backward components. The combine process looks at the forward version and uses this when it creates the session key. This forward version number is one of the output parameters.

The Backward version is always less than or equal to the forward version, otherwise the CKM IDS process cannot mathematically create/recreate session keys.

Combiner

Figure 3:
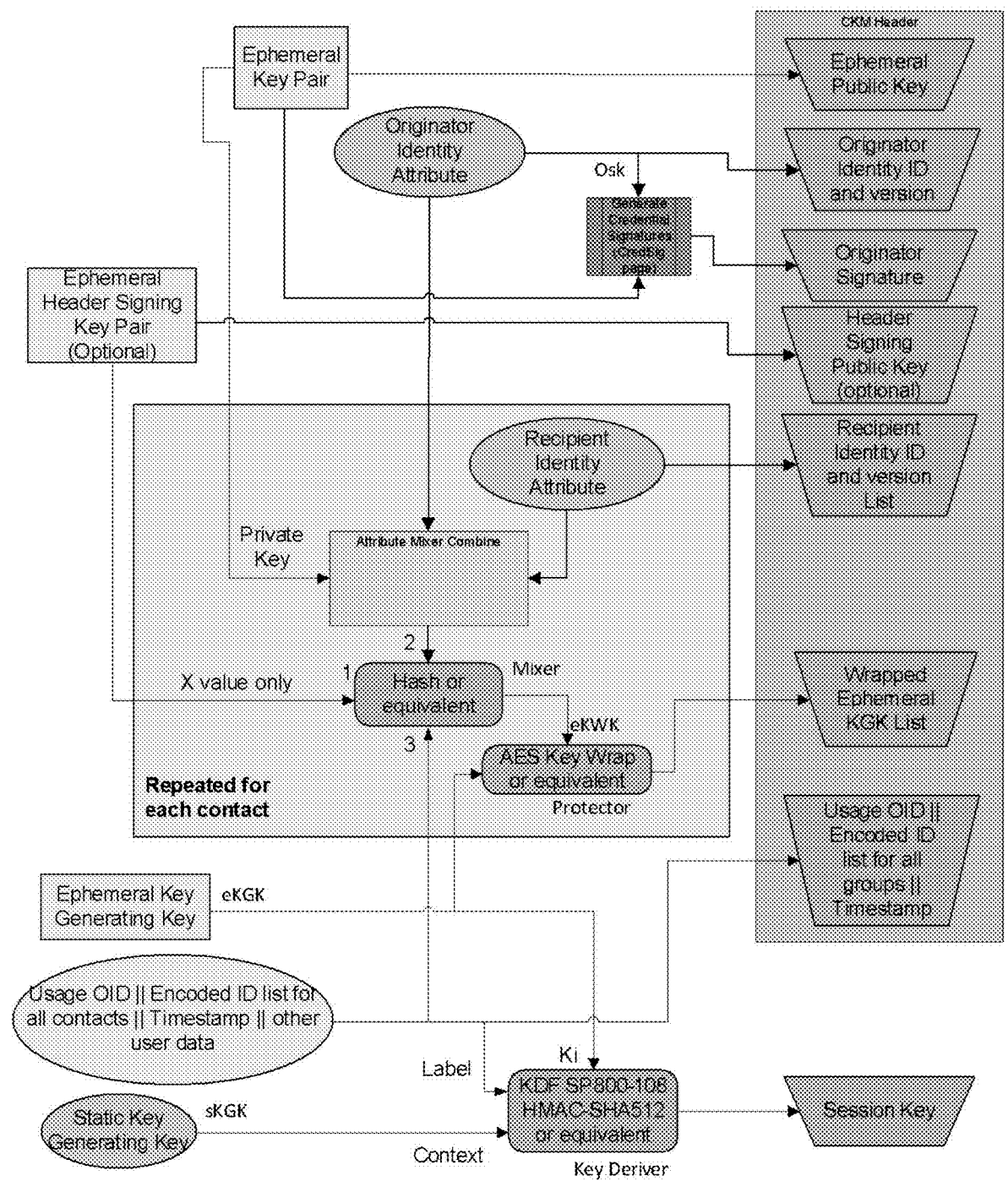
FIG. 3 is a diagram of an exemplary CKM IDS combiner according to the invention.

With reference to FIG. 3, the Combiner performs the CKM IDS Combine process. As shown, the attributes described above are provided as inputs to the Combine process; the ephemeral key pair, the optional ephemeral header signing key pair, and the ephemeral key generating key are internally generated components. The items in the right column are outputs from the combiner; all but the session key are also inputs to the recombiner.

As shown in FIG. 3, everything above the AES Key Wrap box represents Stage 1 operations (Attribute Mixing).

The AES Key Wrap and the Ephemeral Key Generating Key boxes are Stage 2 operations (Ephemeral protection).

All other functions are Stage 3 operations (Session key generation).

The hash, AES key wrap, and KDF SP800-108 HMAC-SHA512 functions are points where algorithmic separation or flexibility may be added to the system; these functions are shown by way of example, and equivalents or other functional alternatives may be substituted in place of the examples. Note however that all participants in the communication must be able to use the same algorithms and limit(s) or that participant will not be able to access the communicated information. Particular implementations can dictate these algorithms and types, although in general there are no such limitations.

1. Attribute Mixer for Combine

Figure 4:
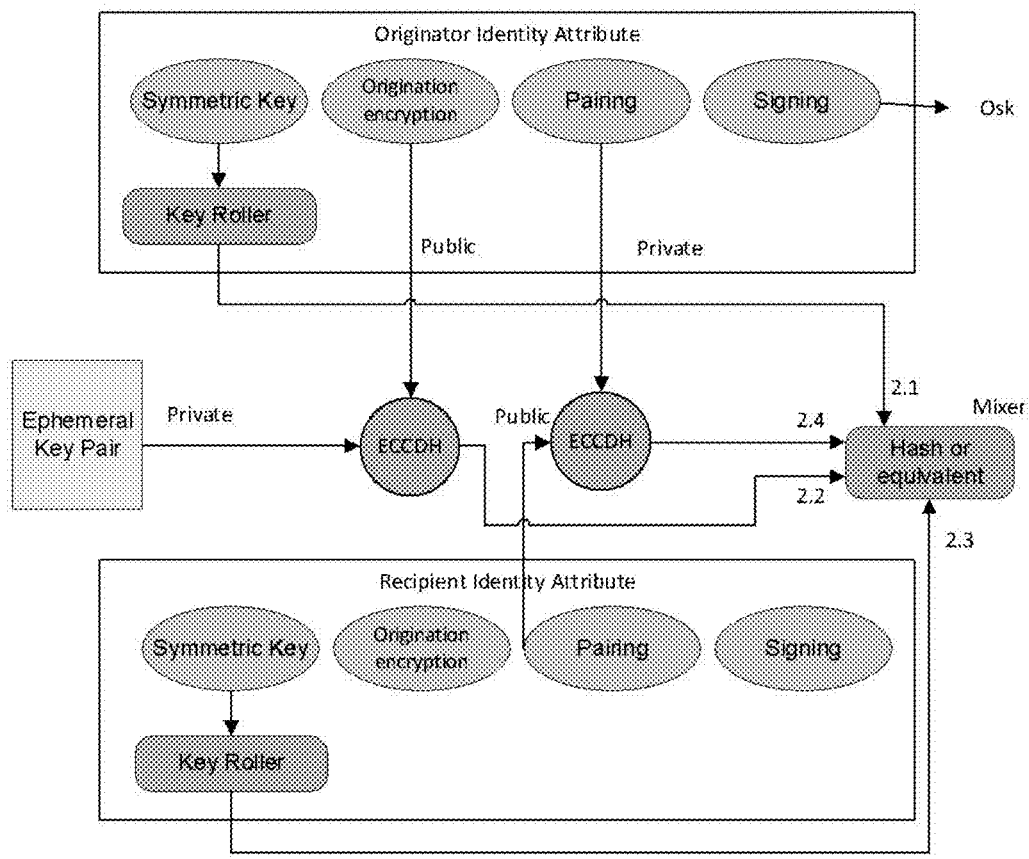
FIG. 4 is a diagram of an exemplary attribute mixing for combine according to the invention.

With reference to FIG. 4, the Attribute Mixer operation is performed for each recipient to create the Key Wrapping Key used to protect the ephemeral Key Generating Key (eKGK).

The Mixer component must have the characteristics of a one-way function. Also, its output must be at least as long as the protector requires. This also must be deterministic in that given the exact same input it will always produce the exact same output. Typically, this is a hash function like, for example, SHA-512, although any similar function with the same attributes would be suitable for use.

For each recipient, this process is repeated. The order in which they are processed is important, however, due to the running hash operation. Therefore, it is preferable that the recipients be sorted by Identifier ID before being processed here.

2. Ephemeral Protection for Combine

The second stage of the combiner, Ephemeral Protection, is closely linked to the attribute mixing. For each recipient, the ephemeral Key Generating Key is encrypted using the output of the "Hash or equivalent" box of FIG. 3. This output is the Key Wrapping Key. If the one-way function output is longer than the ephemeral protection algorithm, the first (most significant) bytes is used as the key. If an IVEC or NONCE is needed it can also be extracted from the raw Key Wrapping Key.

Figure 5:
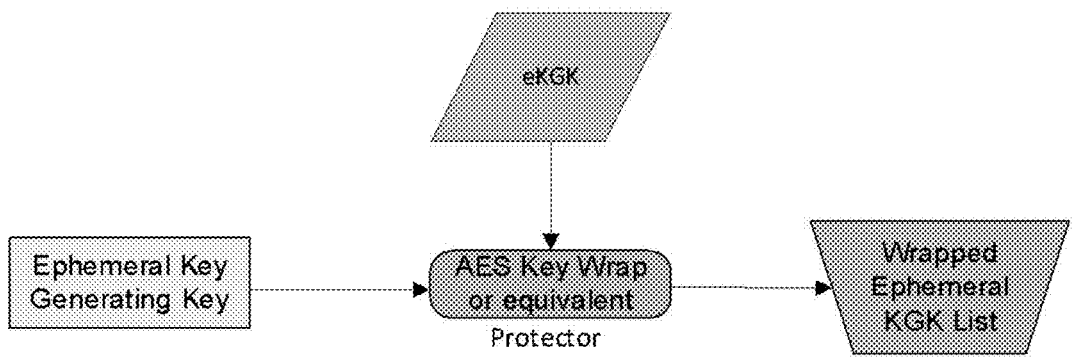
FIG. 5 is a diagram of exemplary ephemeral protection components according to the invention.

With reference to FIG. 5, the protector block must provide data protection at or exceeding the required strength of the session key. Also, the protector block validates that the encryption/decryption used the correct key and succeeded. Therefore, encrypt and hash or algorithms like AES Key Wrap are preferably used because they provide this validation on decryption.

3. Session Key Generation for Combine

Figure 6:
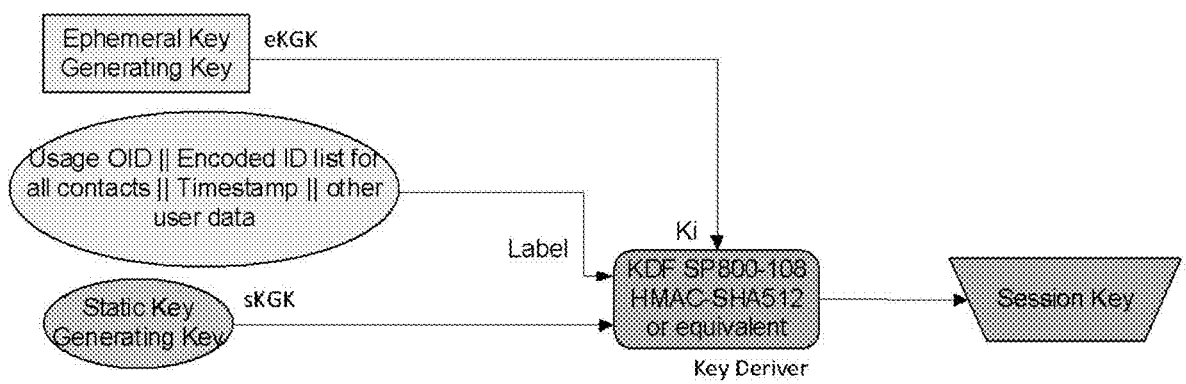
FIG. 6 is a diagram of an exemplary session key generator for combine according to the invention.

The last stage of the combine operation is the creation of the session key. This is where the output of the previous stages is mixed together with the rolled Originators sKGK value to create the session key, as shown in FIG. 6.

The Key Deriver block must be a one-way function and can have the ability to expand a key to any required length needed by the session key user. Examples of this are the NIST SP800-108 Key Derivation functions, Shake 256 and TLS1.3 HKDF.

4. Signature Generator

Figure 7:
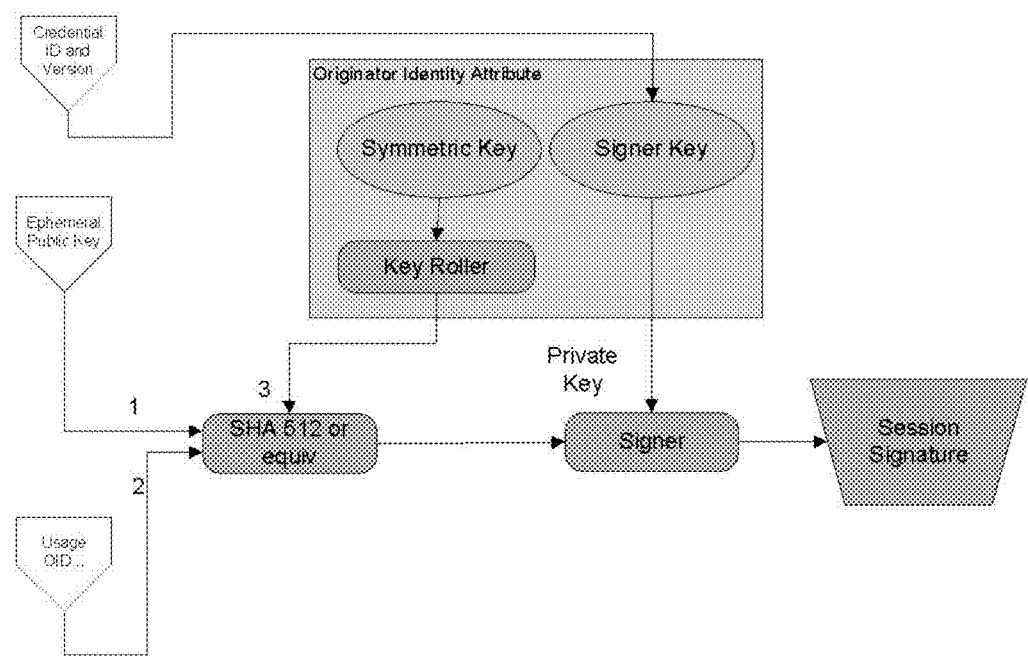
FIG. 7 is a diagram of an exemplary session signature process according to the invention.

The last component of the combiner is the signature generator. Referring to FIG. 7, this component uses the recipient list, ephemeral public key, rolled originator Ask key, and originator signing public key.

The Signature generator must match the signing key pair algorithm. The hash block (SHA512 or the like) should match the recommendations for the signer and the signing algorithm.

5. Usage OID Data

The Usage OID data provides additional session data binding and helps to reduce or at least allow for the detection of message session reuse. Any change of this data will invalidate and change the output of both the combiner and recombiner.

This is also a point where other crypto systems can be linked into the CKM IDS. Any additional user data changes the Usage OID data and the generated keys are thereby significantly affected.

It is also possible to perform message linking using this data. The binding can be just ID information or full key values. This allows for a great deal of flexibility in other systems and in extending the usefulness of the CKM IDS system.

Recombiner

As described above, the combiner function has three phases: Attribute Mixing, Ephemeral protection, and Working key generation. The recombiner has the same stages with some internal differences.

Figure 8:
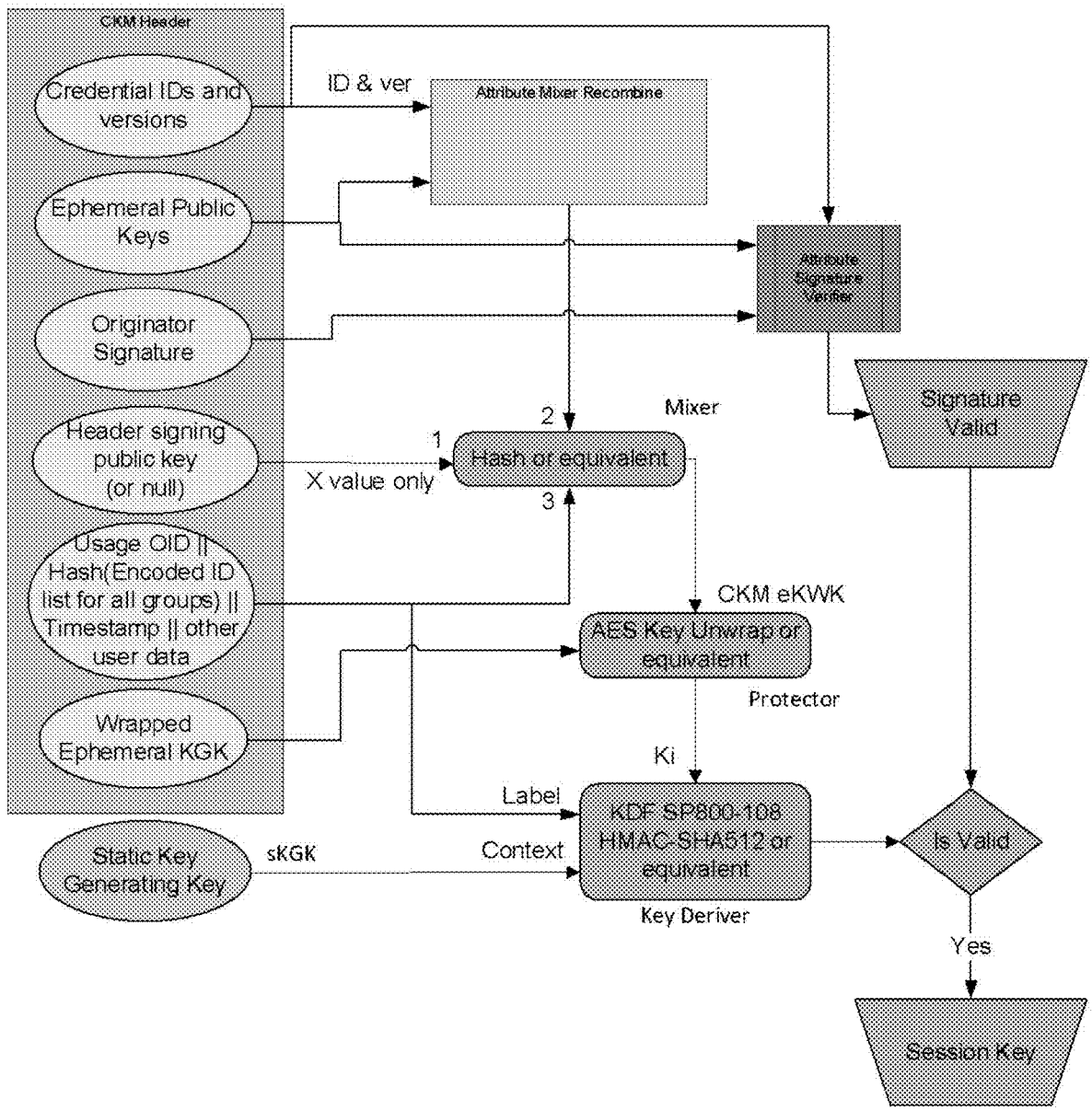
FIG. 8 is a diagram of an exemplary recombiner for CKM IDS according to the invention.

With reference to FIG. 8, the left side shows the input parameters for the recombiner. These are the values that came from the combiner. The mixer, protector, and key deriver blocks must use the same algorithms as the combiner. Note that the session key will not be returned if the Originator signature does not validate.

The sKGK value and signing public key are provided by the originator attribute.

Most of the recombiner operation is the reverse of the combiner operation. Two blocks that require more detail are described below.

1. Attribute Mixer for Recombine

Figure 9:
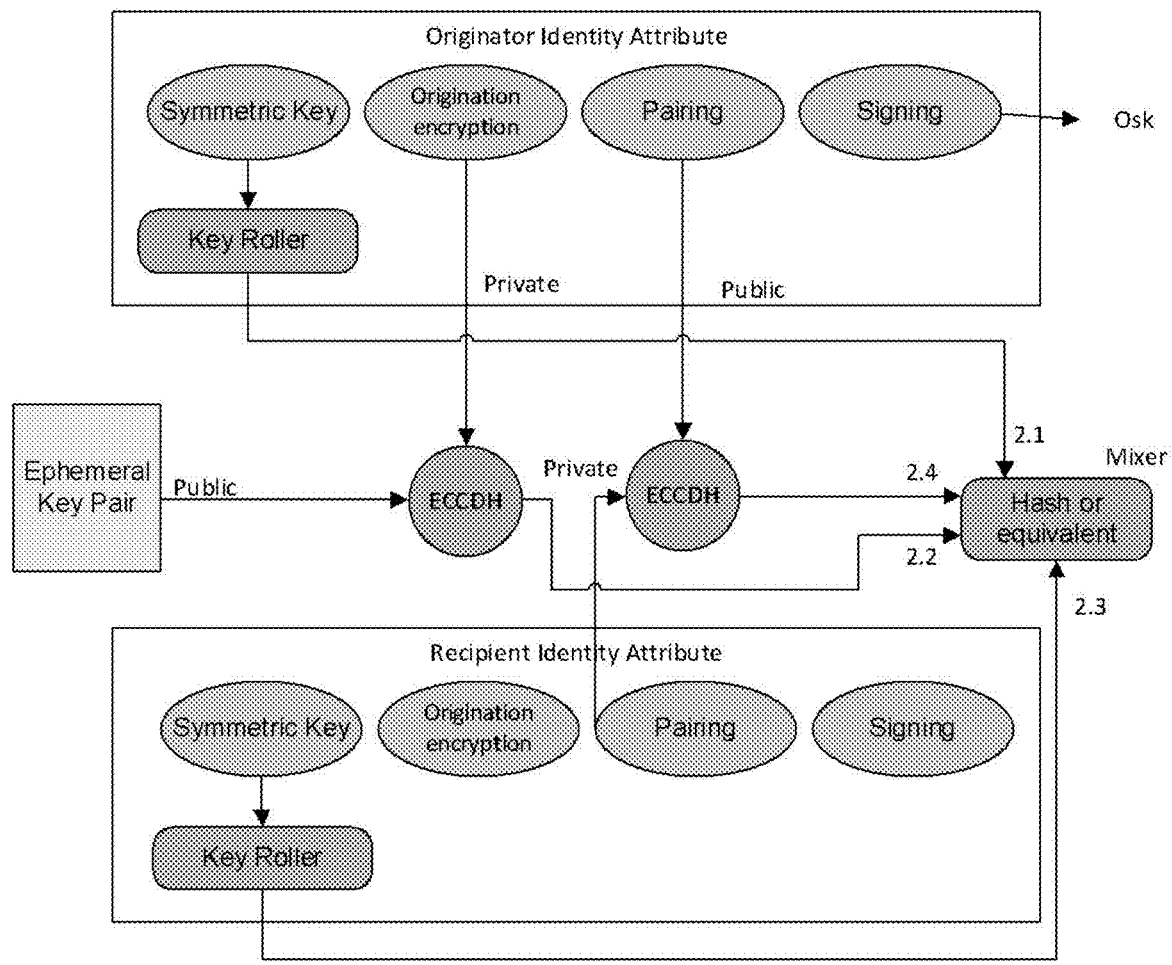
FIG. 9 is a diagram of an exemplary attribute mixer for recombine according to the invention.

With reference to FIG. 9, the attribute mixer for recombine is very similar to the combine version, with the exception that public key parts are used rather than private key parts. The output of the mixer must yield the same output as the combiner, with one overall difference: in the combiner, all of the recipient identity attributes are used to create separate sets of encrypted eKGK values, whereas in the recombiner, the system looks through the list of recipients to find a matching ID for the recipient's Identity Attribute. The recipient's Identity Attribute is be the only one with the private values required to successfully process the attribute mixer and decrypt the eKGK value. Without the decrypted eKGK it is impossible to compute the correct session key.

2. Attribute Signature Validator

Figure 10:
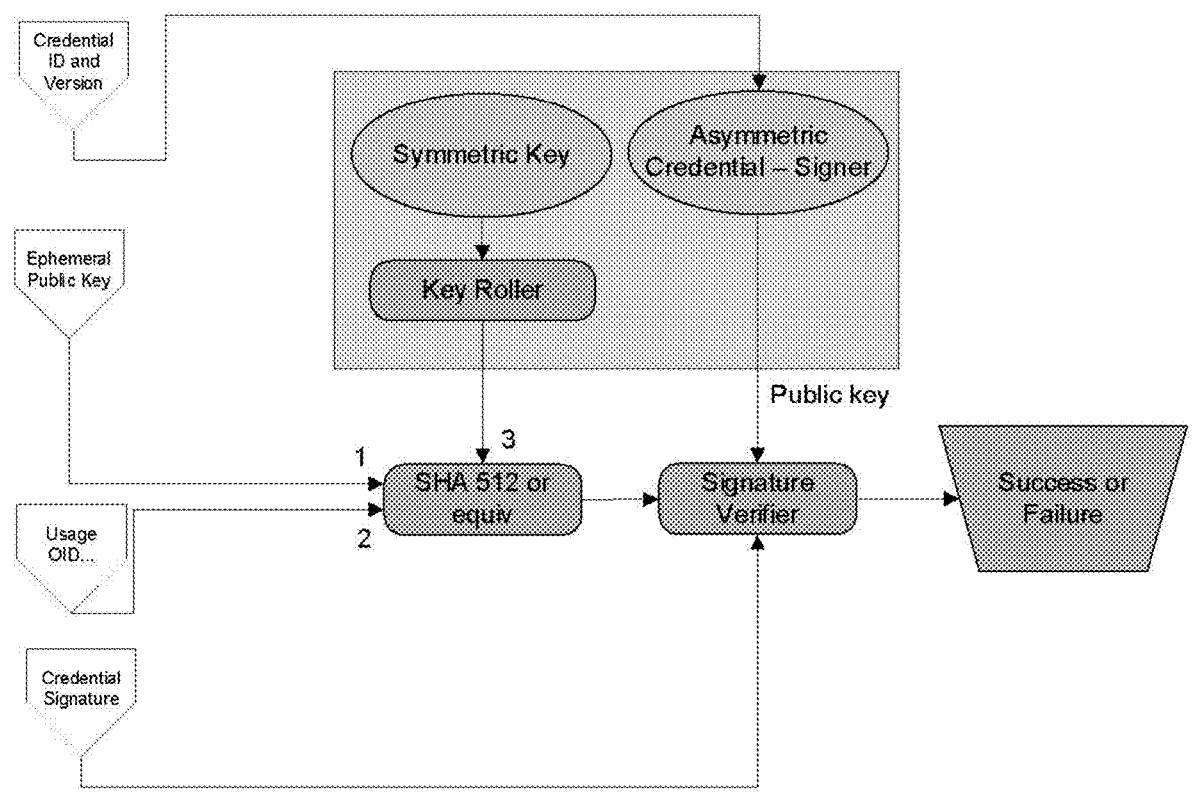
FIG. 10 is a diagram of an exemplary session signature validator according to the invention.

With reference to FIG. 10, the attribute signature verifier is responsible for the recreation of the signing data and the verification of that signature. If the signature is missing or the verification fails for any reason then the recombiner is cancelled and all critical security parameters are zeroized. No data leakage is allowed.

The Signature verifier must match the signing key pair algorithm. The hash block (SHA512 or the like) must match the recommendations for the verifier and the signing algorithm. These values must be the same as the signature generator or the recombine operation will fail.

The invention has been described by way of example and in terms of preferred embodiments. However, the invention as contemplated by the inventor is not strictly limited to the particularly disclosed embodiments. To the contrary, various modifications, as well as similar arrangements, are included within the spirit and scope of the invention. The scope of the appended claims, therefore, should be accorded the broadest reasonable interpretation so as to encompass all such modifications and similar arrangements.

We claim:

1. A method of cryptographically binding communication parties, comprising:
   assigning respective attributes to a sending party and to a receiving party; and
   performing a combine operation;
   wherein the combine operation includes creating, by the sending party, communication keys;
   wherein the attributes include an identity attribute, and input parameters;
   wherein the input parameters include an originator attribute and a list of contacts; and
   wherein creating the communication keys includes:
      combining values from the attributes to create an ephemeral key wrapping key;
      using the ephemeral key wrapping key to protect an ephemeral key generating key; and
      mixing at least the ephemeral key generating key and a static key generating key to create the session key.

2. The method of claim 1, wherein the identity attribute includes at least one of:
   an origination encryption key pair;
   a pairing key pair;
   an origination signing key pair;
   an attribute symmetric key;
   a static key generating key;
   an identity ID; and
   an identity name.

3. The method of claim 1, further comprising performing a key-rolling operation, comprising utilizing rolling key values to re-key at least one of the attributes.

4. The method of claim 1, further comprising encrypting communication data using the session key; and
   sending the encrypted communication data to the receiving party.

5. The method of claim 4, further comprising creating output parameters, wherein the output parameters include at least some of the input parameters, and ephemeral data.

6. The method of claim 5, further comprising performing a recombine operation;
   wherein the recombine operation includes:
      receiving, by the receiving party, the output parameters and the sending party identity attribute;
      validating the output parameters; and
      identifying and validating the originator.

7. The method of claim 6, further comprising:
   receiving, by the receiving party, the encrypted communication data;
   receiving, by the receiving party, the session key, if validating the output parameters and identifying and validating the originator were successful; and
   decrypting the encrypted communication data by the receiving party, using the session key.

8. The method of claim 6, further comprising zeroing at least some of the output parameters if at least one of
   validating the output parameters, and
   identifying and validating the originator,
   was unsuccessful.

9. A cryptographic communication binder, comprising:
   an attribute mixer configured to assign respective attributes to a sending party and to a receiving party; and
   a combiner configured to create, by the sending party, communication keys;
   wherein the attributes include an identity attribute, and input parameters;
   wherein the input parameters include an originator attribute and a list of contacts; and
   wherein the combiner further includes a communication key generator configured to combine values from the attributes to create an ephemeral key wrapping key, use the ephemeral key wrapping key to protect an ephemeral key generating key, and mix at least the ephemeral key generating key and a static key generating key to create the session key.

10. The cryptographic communication binder of claim 9, wherein the identity attribute includes at least one of:
    an origination encryption key pair;
    a pairing key pair;
    an origination signing key pair;
    an attribute symmetric key;
    a static key generating key;
    an identity ID; and
    an identity name.

11. The cryptographic communication binder of claim 9, further comprising a key roller configured to utilize rolling key values to re-key at least one of the attributes.

12. The cryptographic communication binder of claim 9, further comprising a first cryptographic engine configured to encrypt communication data using the session key and send the encrypted communication data to the receiving party.

13. The cryptographic communication binder of claim 12, wherein the first cryptographic engine is further configured to create output parameters, wherein the output parameters include at least some of the input parameters and ephemeral data.

14. The cryptographic communication binder of claim 13, further comprising a recombiner configured to:
   receive, by the receiving party, the output parameters and the sending party identity attribute;
   validate the output parameters; and
   identify and validate the originator.

15. The cryptographic communication binder of claim 14, further comprising a second cryptographic engine configured to:
   receive, by the receiving party, the encrypted communication data;
   receive, by the receiving party, the session key, if validating the output parameters and identifying and validating the originator were successful; and
   decrypt the encrypted communication data by the receiving party, using the session key.

16. The cryptographic communication binder of claim 14, wherein the recombiner is further configured to zero at least some of the output parameters if at least one of
   validating the output parameters, and
   identifying and validating the originator,
   was unsuccessful.

* * * * *